United States Patent [19]

Van Nie et al.

[11] 4,234,140
[45] Nov. 18, 1980

[54] MAGNETIC TAPE CASSETTE DRIVE SYSTEM

[75] Inventors: Cornelis P. Van Nie, Eindhoven, Netherlands; Franz Werner; Gerhard Maryschka, both of Vienna, Austria; Joannus H. F. C. Sieben, Eindhoven, Netherlands

[73] Assignee: U.S. Philips Corporation, New York, N.Y.

[21] Appl. No.: 974,645

[22] Filed: Dec. 29, 1978

[30] Foreign Application Priority Data

Aug. 28, 1978 [NL] Netherlands .......................... 7808832

[51] Int. Cl.³ .......................... G03B 1/04; G11B 15/32
[52] U.S. Cl. .................................... 242/199; 360/96.3
[58] Field of Search ............... 242/198, 199, 200, 197, 242/68.3; 360/96.1, 96.2, 96.3, 96.4, 96.5, 96.6

[56] References Cited

U.S. PATENT DOCUMENTS

| | | | |
|---|---|---|---|
| 3,684,295 | 8/1972 | Strain et al. | 360/96.5 |
| 3,739,998 | 6/1973 | Esashi et al. | 242/68.3 |
| 3,869,099 | 3/1975 | Inaga | 242/199 |

*Primary Examiner*—Leonard D. Christian
*Attorney, Agent, or Firm*—David R. Treacy

[57] ABSTRACT

A magnetic tape drive system for a video cassette recorder comprises a flip-over magnetic tape cassette having side-by-side reel hubs, each hub having a disc-shaped centering and drive member in the center of the hub with a central centering aperture and one or more drive apertures at some radial distance from the centering aperture, and a drive arrangement with drive spindles having a centering pin for the centering aperture in the reel hub, and at least one resiliently depressable drive pin which engages a drive aperture. To ensure correct positioning and drive of the spools and an excellent lace-up, and prevent undesired variations in the tensile stress in the magnetic tape and thus variations of the stretch of the magnetic tape, the reel hubs are resiliently urged onto stop surface which rotate with the drive spindles. The resilient urging devices and drive apertures are arranged to prevent disturbing forces on the reel hub.

9 Claims, 13 Drawing Figures

MAGNETIC TAPE CASSETTE DRIVE SYSTEM

BACKGROUND OF THE INVENTION

1. Field of the Invention

The invention relates to a magnetic tape drive system for passing a thin flexible magnetic tape along a plurality of magnetic heads and comprising:

(A) a "flip-over" reversible magnetic tape cassette, which is adapted to be supported on a magnetic tape cassette recording and/or playback apparatus (hereinafter called a cassette apparatus) in a first and in turned over or reversed second position, in either of these positions the magnetic tape being disposed to permit cooperation with the magnetic heads. Such a cassette has first and second adjacent reel hubs which are rotatable about parallel axes of rotation, each hub having a substantially tubular reel winding member which has an at least substantially cylindrical inner wall (as used herein "cylindrical" is to be understood as meaning circular cylindrical) and two annular end walls which are disposed in planes at some axial distance from each other perpendicular to the axis of rotation, as well as a disc-shaped centering and drive member midway between and parallel to the two end walls of the reel winding member and provided with parts which define a central centering aperture as well as at least one drive aperture at some radial distance from the centering aperture; first and second plane-parallel main walls which axially enclose the two reel hubs with play, each provided with a first aperture coaxial with the first reel hub and a second aperture coaxial with the second reel hub; and a length of magnetic tape having a first end connection to the first reel hub and having a second end connected to the second reel hub, so as to enable it to be wound back and forth between the reels, with a straight tape portion along the front of the magnetic tape cassette.

(B) a cassette apparatus having a frame a drive arrangement comprising first and second drive spindles which are rotatable about parallel axes of rotation, each provided with a centering in with a free end adapted to cooperate with the centering apertures in the reel hubs of the magnetic tape cassette; each drive spindle having at least one drive pin with a free end, disposed at some radial distance from the centering pin, resiliently depressable in a direction parallel to the axis of rotation of the drive spindle, and adapted to cooperate with a drive aperture in the reel hubs of the magnetic tape cassettes during operation; and cassette supporting means connected to the frame for cooperation, in the cassette first or second position, with the first or the second main wall respectively and thus supporting the magnetic tape cassette on the drive arrangement in an operating position in which the two reel hubs cooperate with the centering pins and the drive pins of the two drive spindles.

2. Description of the Prior Art

Such a magnetic tape drive system is known from U.S. Pat. 3,027,110. In this magnetic tape drive system a plurality of drive apertures are formed in the disc-shaped centering and drive member of each reel hub at equal radial distances from the axis of rotation of the reel hub and at equal distances from each other. If two separate winding motors for the two reel hubs were used, the spindles of the winding motors could also be used as centering pins for centering the reel hubs. The height positions of the reels in the magnetic tape cassette are determined by the location of the cassette on the cassette supporting means.

The known magnetic tape drive system is intended for recording and/or reproducing audio signals on magnetic tape. For video applications, where signals of substantially larger bandwidth than in audio applications should be recorded and reproduced, such a magnetic tape drive system is less suitable. In the currently used magnetic video tape recorders which have been designed for the consumer market the signals are written on the magnetic tape with the aid of rotary video heads as obliquely oriented elongate and closely adjoining tracks. The oblique tracks are approximately 18 to 23 microns wide at a length of approximately 100 mm, while in some magnetic tape recorders, employing two magnetic video heads with different azimuth alignments the tracks directly adjoin each other without intermediate spacing. In order to ensure that with such magnetic tape drive systems a video cassette which has been recorded on one specific video recorder can be played back on another video recorder without loss of quality, a high accuracy of the tape transport and the tape guidance is essential, so that variations in the stretch of the magnetic tape and thus variations in the tension in the magnetic tape are minimized. In addition, the one video recorder should be capable of reading the tracks which have been written on the magnetic tape by another video recorder, and time errors should also be avoided because of their adverse effect on the picture quality. In view of the stringent compatibility requirements thus imposed undefined frictional forces should not be exerted on the magnetic tape reels, while other sources of tape tension variations should be eliminated as far as possible.

Conventional video recorders employ several servo systems so as to obtain an accurate tape transport speed and minimal tape tension variations. As an example, the speed of rotation of the capstan is automatically controlled by means of one servo system, while other servo systems drive the rotary magnetic heads, the magnetic head control and the drive spindles. As a result of the variations in tension which occur in the magnetic tape, frictional forces which act an the magnetic tape reels represent errors for the last-mentioned servo systems and also for the other servo systems.

SUMMARY OF THE INVENTION

It is an object of the invention to provide a magnetic tape drive system which reduces friction forces on and uneven motion of the tape reels, and therefore is more suitable for use in video recorders.

According to the invention, the drive arrangement includes resilient loading means for resiliently urging the reel hubs against axial positioning means on the drive spindles during operation; and that in the operating position the reel hubs, the reels wound thereon, and the loading means in contact with the hubs run entirely clear of the walls of the magnetic tape cassette. Thus variations in tension in the magnetic tape, which could result from a less satisfactory centering and alignment of the reels relative to the drive spindles, are avoided.

In many magnetic video tape recorders the drive arrangement is provided with a cassette holder which is movable between an open and a closed position for inserting or removing the magnetic tape cassette when in the open position, and for keeping the magnetic tape cassette in the operating position when in the closed position. In a preferred embodiment of the invention of advantage for video cassette recorders provided with such a cassette holder the resilient loading means for resiliently urging the reel hubs against the reel hub positioning means during operation comprise first and second reel hub loaders, which are journalled with play in the cassette holder, which loaders are each provided with a centering portion for centering relative to the tubular reel winding member of a reel hub, and which furthermore comprise first and second pressure springs, which engage the reel hub loaders by a point contact at a central location opposite the centring portions. A first advantage of this embodiment is that minimal axial forces are exerted on the drive spindles, and tensile forces will never act on the drive spindle. A second advantage is that the loading means are rotation-symmetrical and consequently will not give rise to any unbalance of the reels, which is of special importance during rapid transport of the magnetic tape during fast forward or reversal winding. Speeds up to roughly 2,500 revolutions per minute may then occur. Such a speed corresponds to a tape speed of approximately 3 meters per second during fast winding. Other advantages are that the construction is simple and that removal of the magnetic tape cassette is not hampered by the drive spindles.

In a further embodiment the cassette holder is provided with a partly open bottom which faces the cassette supporting means of the drive arrangement and a member with bearing apertures for the two reel hub loaders, which member faces away from the cassette supporting means, the reel hub loaders being rotatable and axially movable with play in the apertures in the bearing member and each reel hub loader having a stop collar for limiting the axial movement in the direction of said bottom, and the cassette holder having resilient means for urging an inserted cassette in the direction of the bottom. The distance between the reel hub loaders and the bottom of the cassette holder, the dimensions of the magnetic tape cassette and the reel hubs, as well as the dimensions of the cassette holder and the cassette supporting means on the drive arrangement are all adapted to each other in such a way that in the open position of the cassette holder a magnetic tape cassette is movable over the bottom of the cassette holder without touching the reel hub loaders, and that in the closed position of the cassette holder the magnetic tape cassette is supported by the cassette supporting means at such a distance from the bottom of the cassette holder that the reel hub loaders cooperate with the reel hubs so as to be freely movable in the apertures of the bearing member. In this embodiment the reel hub loaders do not hamper insertion of the magnetic tape cassette into the cassette holder. Furthermore, no separate aids are necessary for applying the reel hub loaders to the reel hubs, because this is effected automatically when the cassette holder is moved from its open to its closed position.

According to another preferred embodiment the parts of the discshaped centering and drive members of the reel hubs which define the drive apertures have flat wall portions for cooperation with the drive pins of the drive spindles, which flat wall portions extend substantially in a radial direction relative to the axis of rotation of the reel hub, so as to prevent the drive pins from transmitting nontangentially directed forces to the reel hubs. In this embodiment only minimal play is required between a drive pin and the wall of a drive aperture, because tolerances in the radial position of the drive pin are taken up by the elongate shape of the drive aperture. Thus, the impact between a drive pin and the wall of the drive aperture when the movement of the reel is reversed or during starting or braking of the reel will be minimized, which is favorable for the life expectancy of the magnetic tape drive and for the accuracy of the drive. Another advantage is that the bearing arrangement of the drive spindle is prevented from being loaded unnecessarily by non-tangential forces, which obviously do not contribute to the torque to be exerted.

In order to obtain a well-defined position of the magnetic tape reels relative to the drive spindles in yet another preferred embodiment each of the annular end walls of the reel hubs is provided with three axially extending projections which are disposed at equal radial distances from the axis of rotation of the relevant reel hub and equidistant from each other. Each of the stop means which rotate along with the drive spindles for cooperation with the annular end walls of the reel hubs has an annular stop surface which is disposed in a plane perpendicular to the axis of rotation of the relevant drive spindle, so that the reel hubs and the said stop means cooperate with each other by means of a three-point contact. As the reel hubs are generally manufactured from a thermoplastic material by an injection-molding process, the provision of the axial projections will present no practical technical problems. The stop means which rotate along with the drive spindles may comprise accurately machined faces of metal stop rings.

Within the scope of the invention an embodiment is also possible which ensures an entirely play-free centering of the reel hub on the drive spindles. This embodiment the centering apertures of the reel hubs have a transverse dimension which is smaller than the transverse dimension of the centering pins of the drive arrangement, and the disc-shaped centering and drive members comprise portions which relative to the axis of rotation of the reel hub, define slots which extend radially and which terminate in the centering aperture, so as to enable the disc-shaped centering and drive member to be slid onto a centering pin of a drive spindle so as to be clamped thereon, the portions which are separated from each other by the slots being slightly bent.

Furthermore, other embodiments are possible within the scope of the invention, which do not require the use of reel hub loaders which are connected to a cassette holder. For example be characterized the resilient loading means for resiliently urging the reel hubs against the reel hub positioning means during operation may comprise a plurality of pressure members, mounted on each drive spindle and movable to a limited extent between a first position and a second position nearer the axis of rotation of the relevant drive spindle, as well as resilient means for loading the pressure members towards their first position, and the inner wall of the tubular reel winding member of each reel hub maybe provided with an internal annular stop for the pressure members, the pressure members bearing on the annular stops of the reel hub during operation and the said resilient means exerting a force thereon, of which at least a component is directed towards the reel hub positioning means. To avoid abrupt pushing or pulling of the drive spindles during placement onto or removal of the magnetic tape cassette from the drive spindle the inner wall of each of the tubular reel winding members near each of the two end walls has a diameter which decreases gradually down to the annular stop for gradually moving the pressure members from their first position towards their second position until the annular stop is reached, when the magnetic tape cassette is placed onto the drive arrangement. Thus the required force increases uniformly.

According to still a further embodiment of the invention, in which the resilient loading means for resiliently urging the reel hubs against the reel hub positioning means during operation are disposed at the location of the drive spindles but which comprise no movable parts, each of the reel hubs, near each of the end walls of the tubular reel winding member, is provided with an armature ring of a magnetizable material, and each of the drive spindles is provided with magnetic means for magnetically drawing a reel hub against the reel hub positioning means in conjunction with an armature ring. When the magnetic means for pulling the reel hubs against the reel hub positioning means in conjunction with the armature rings comprise electro-magnets, this embodiment even enables, by switching the electric current to the electro-magnets, placement and removal of the magnetic tape cassette without the exertion of axial forces on the drive spindles. Moreover, use can be made of an embodiment in which the magnetic means on the drive spindles comprise annular permanent magnets whose an outer wall has the shape of a truncated cone whose portion having the smallest diameter is directed towards the free end of the centering pin, and the armature rings have an inner wall with a conical shape corresponding to the shape of the outer wall of the permanent magnets on the drive spindles, an air gap of substantially uniform thickness being formed in the operating position between the outer wall of each permanent magnet and the inner wall of the armature ring which magnetically cooperates therewith. With this shape of the magnet and the armature ring, when putting on the magnetic tape cassette initially a large air gap is present between the permanent magnet and the armature ring of every reel hub, so that the centering of the reel hub on the centring pin of the drive spindle is not adversely affected by magnetic forces exerted on the reel hub during centering. The shape of the permanent magnet and the corresponding wall of the armature ring may be selected in such a way that an optimum force-path characteristic is obtained. During operation the permanent magnets on the drive spindles are surrounded by the armature rings of the reel hubs, so that magnetic stray fields can be shielded in a satisfactory manner.

The invention will now be described in more detail with reference to the drawing which schematically shows some embodiments.

DESCRIPTION OF THE PREFERRED EMBODIMENTS

Figure 1:
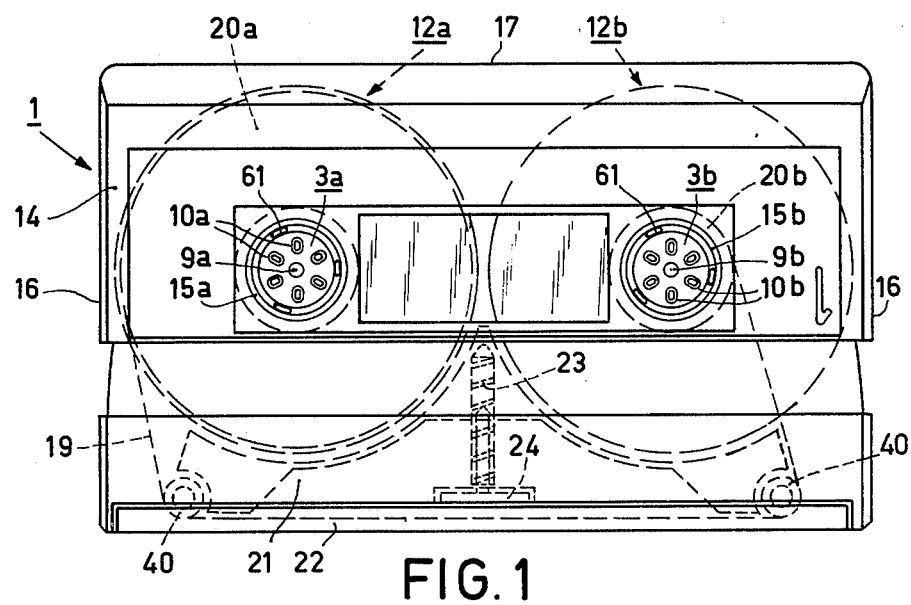
FIG. 1 is a plan view of a flip-over video cassette, provided with a guard which is pivotable to two sides and a slide which is guided on the housing.
Figure 2:
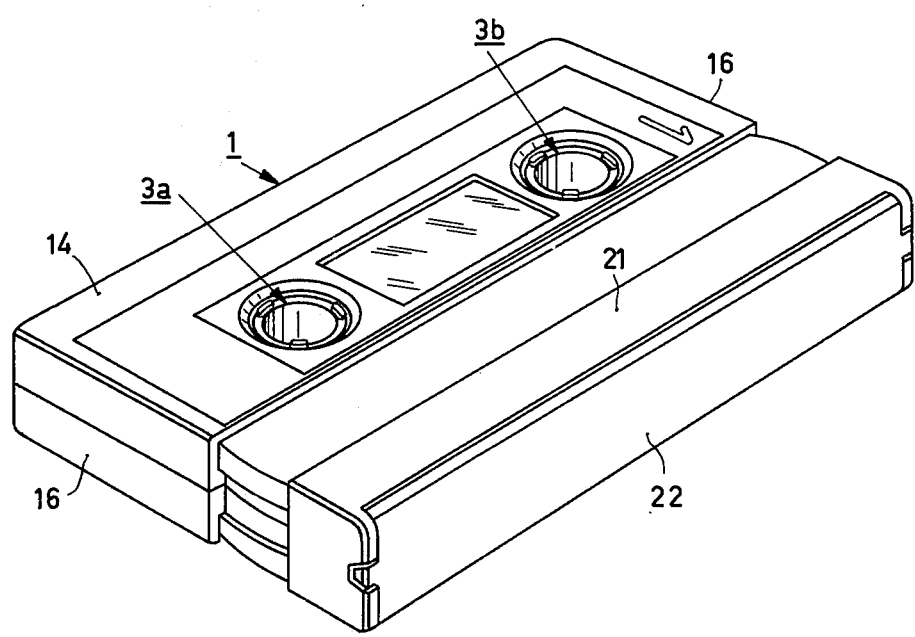
FIG. 2 is a perspective view of the video cassette of FIG. 1, FIG. 3 again shows the perspective view of FIG. 2 but now with the slide retracted over the housing and with the guard pivoted open in a first position, FIG. 4 again shows the perspective view of FIG. 3, but now with the guard pivoted to its second position.
Figure 3:
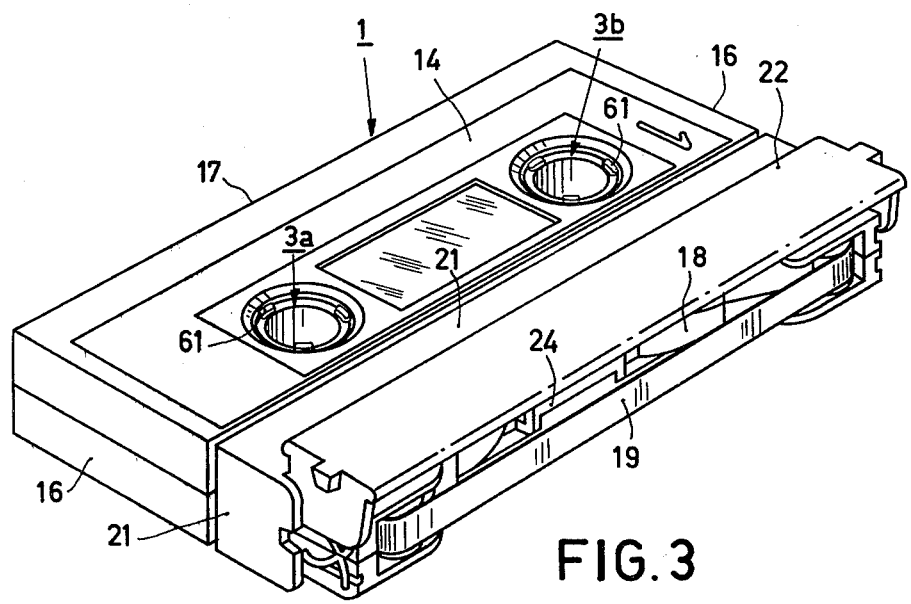
Figure 4:
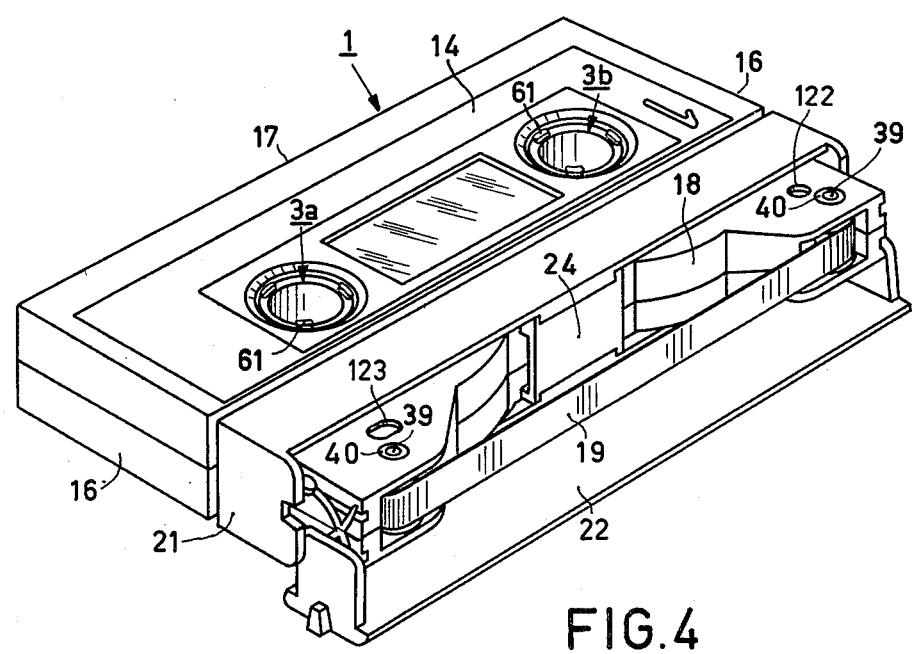

In the following description of the embodiments shown in the drawing, the various parts are designated by different reference numerals, that when two identical parts are used these bear the same reference numeral and are only distinguished by the addition of "a" or "b" when this is of importance for a correct understanding of the drawing.

The video cassette 1 (FIGS. 1 to 4 as well as FIGS. 7 to 9) is a so-called flip-over or reversible magnetic tape cassette which is adapted to cooperate with rotary magnetic heads of a video recorder when supported on the apparatus in a first position or in a reversed (turned over) second position. The cassette is provided with first and second adjacently disposed reel hubs 3 which are rotatable about parallel axes of rotation 2, each with a substantially tubular reel winding member 4 having an at least substantially cylindrical inner wall 5, a substantially cylindrical outer wall 6 and two annular end walls 7 which are disposed in planes spaced axially from each other perpendicular to the axis of rotation 2. A disc-shaped centering and drive member 8 is located midway between and parallel to the two end walls 7 of the reel winding member and is provided with parts which define a central centering aperture 9 and six drive apertures 10 at some radial distance from the centering aperture 9. To both sides of the reel hub 3 transparent flanges 11 are secured, so that the assembly comprising the reel hub 3 and the two flanges 11 constitute a spool 12. For attaching a magnetic tape to the reel hub the hub has a recess 13 on its circumference. The end of a magnetic tape is pressed into this recess and retained therein by means of a resilient clamping member, not shown.

In the video cassette the two spools 12 are axially enclosed with play by two plane-parallel main walls 14 each having a first aperture 15a which is coaxial with the first reel hub 3a as well as a second aperture 15b which is coaxial with the second reel hub 3b. The main walls 14 are interconnected by said walls 16, a rear wall 17 and a partly open front wall 18 which is disposed at a front side opposite the rear wall 17. The cassette contains a length of magnetic tape 19, which is connected to the first reel hub 3a at a first end and to the second reel hub 3b at a second end, so as to enable it to be wound from the first reel hub 3a to a reel 20b on the second reel hub 3b and back from the second reel hub 3b to a reel 20a on the first reel hub 3a. A straight tape portion passes along the front of the cassette. A slide 21 is movably guided on the cassette housing, which slide in its retracted position releases a guard 22, alowing this guard to be pivoted open in a first direction (see FIG. 3), or in a second direction (see FIG. 4). Although the cassette is reversible, the straight portion of the magnetic tape 19 at the front of the cassette is always accessible to elements of the video recorder from the same side, independently of the position of the cassette on the drive arrangement. The slide 21 is resiliently loaded towards the front by means of a pressure spring 23 which bears on a spring cup 24. On each side the cassette has an aperture 122, and an aperture 123 which is slightly elongated in a direction parallel to the connecting line between the centers of the two reel hubs 3. These apertures accept locating pins for a drive arrangement as is explained hereinafter.

For further information about the video cassette shown in the drawing, reference is made to previous non-published Netherlands patent application No. 78 04 936 to which U.S. Pat. application Ser. No. 974,296, filed Dec. 29, 1978 and assigned to the assignee of the instant application, corresponds, hereby incorporated by reference.

The drive arrangement comprises a frame 25 and two drive spindles 27 which are rotatable about parallel axes of rotation 26, which spindles are each provided with a centering pin 28 having a conical free end 29 and which are each adapted to cooperate with a centering aperture 9 in a reel hub 3 of the magnetic tape cassette 1. Each of the centering pins 28 is integral with a motor spindle 30 of an electric drive motor 31.

At some radial distance from the centering pin 28, there is provided a drive pin 32 with a rounded free end 33 on each drive spindle 27, which drive pin is resiliently depressable in a direction parallel to the axis of rotation 26 of the drive spindle 27 against the force of a pressure spring 117. The drive pins are adapted to cooperate with a drive aperture 10 in a reel hub 3 of the video cassette 1.

Figure 8:
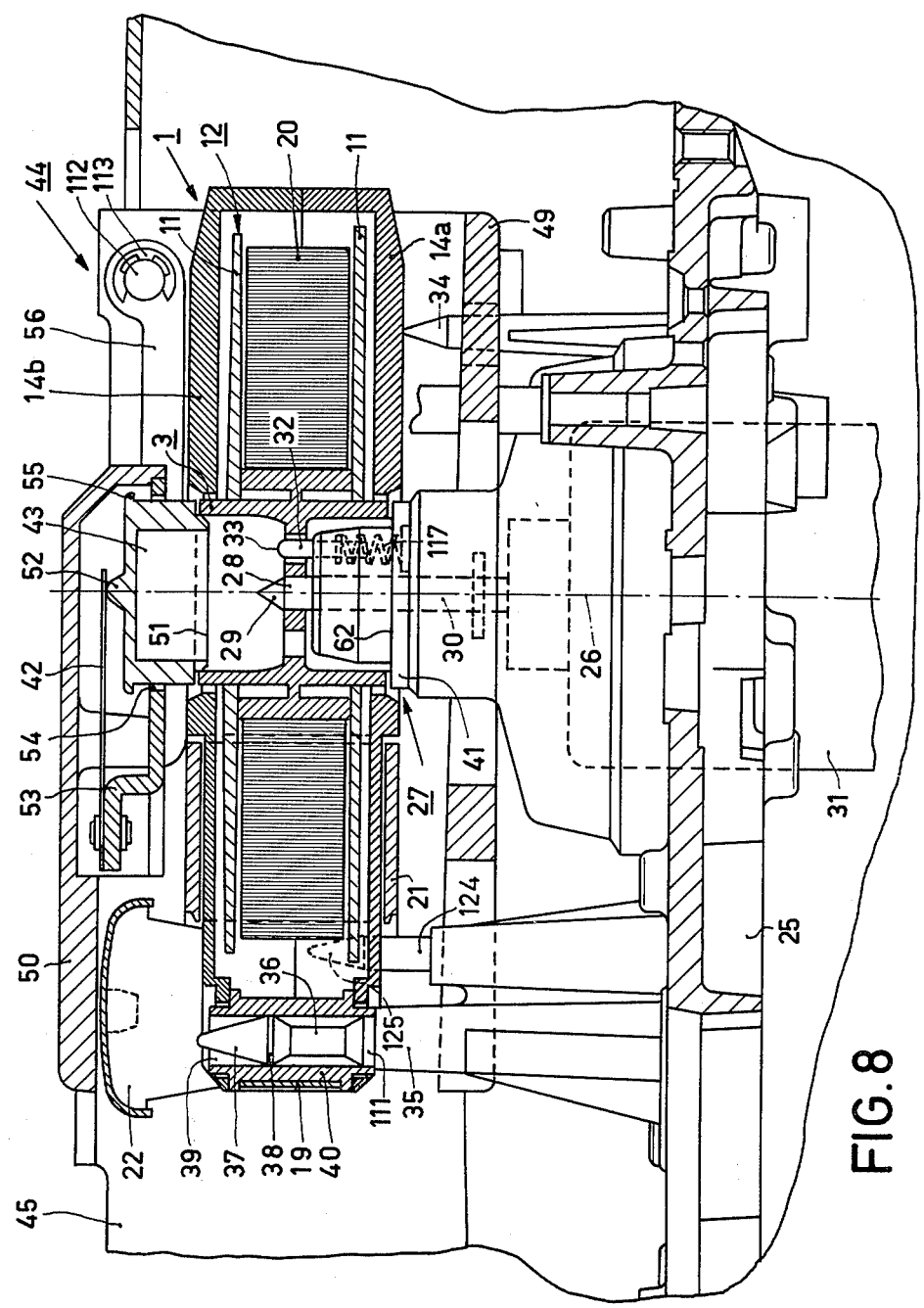
FIG. 8 is a sectional view of a part of FIG. 7 on an enlarged scale, but now with the cassette holder in its closed position, in accordance with the arrows VIII—VIII in FIG. 9.
Figure 10:
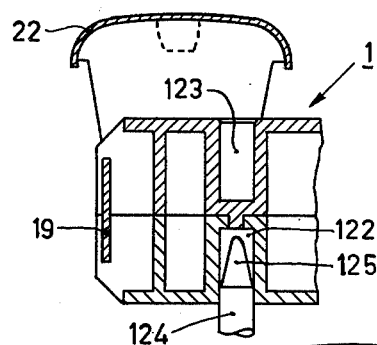
FIG. 10 shows a cross-section in accordance with the arrows X—X in FIG. 9.

For supporting the video cassette in its first position or in its second position there are provided cassette supporting means 34 and 35 on the frame 25, which means cooperate with a main wall 14 of an inserted cassette for thus supporting the cassette on the drive arrangement in an operating position, see FIG. 8, in which the two reel hubs 3 cooperate with the centering pins 28 and with the drive pins 32. The supporting means 34 and 35 comprise projections which are integral with the frame 25, metal locating pins 36 for the tape guide elements 40 being secured in the projections 35. They have a conical end 37 and engage with the recess 39 of tape guide members 40 of the video cassette with cylindrical portions 38 and 111. These tape guide members extend beyond the main walls 14 of the cassette, so that when the cassette is in its operating position the tape guide members 40 are positioned directly on the cassette supporting means 35. Thus it is ensured that the correct position of the tape guide members relative to the parts of the video recorder which cooperate with the magnetic tape is not affected by dimensional tolerances of the video cassette housing. The tape guide members have some radial and axial play in the main walls 14; the locating pins 36 do not serve for locating the cassette housing on the drive arrangement. For this purpose further locating pins 124 are provided on the frame 25, also see FIG. 10.

For axially positioning the reel hub 3 each drive spindle 27 is provided with reel hub positioning means comprising stop means in the form of planar annular surface on stops 41 which rotate along with the drive spindle for cooperation with the annular end walls 7 of the reel hubs 3. During operation each of the reel hubs 3 is resiliently urged against a stop 41 by means of resilient loading means, to be discussed hereinafter, which comprise a leaf spring 42 as well as hub loader member 43. The reel hubs 3 are then supported at such a height in the cassette 1 that the spools 12 run completely clear of the walls of the video cassette.

Figure 7:
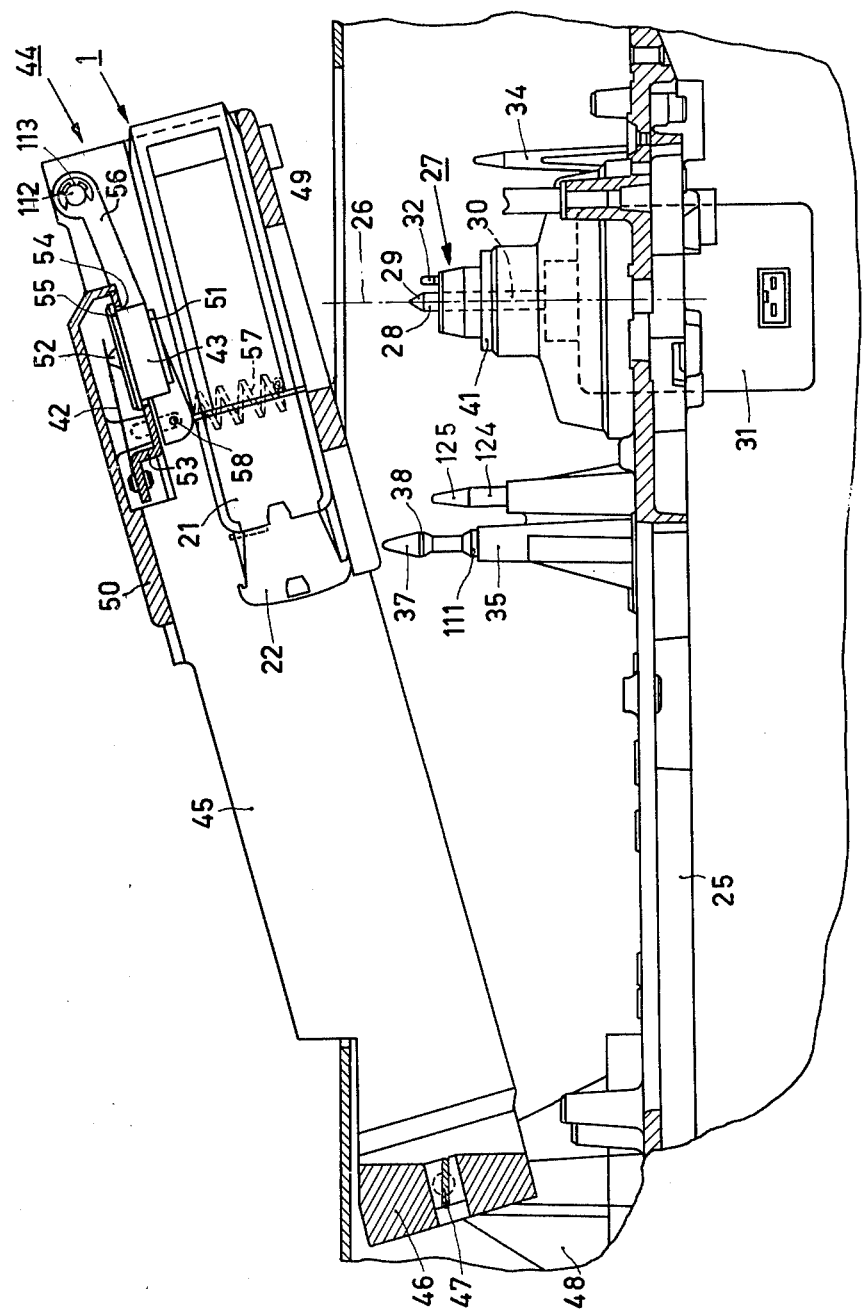
FIG. 7 is a side sectional view of a part of a video recorder having a pivotable cassette holder, a video cassette in accordance with FIGS. 1 to 4 being placed in the cassette holder and the slide being retracted over the housing.

The video recorder is provided with a cassette holder 44 which is movable between an open position, see FIG. 7, and a closed position, see FIG. 8, for inserting or removing the video cassette 1 in an open position and for retaining the video cassette in the operating position in the closed position. The cassette holder comprises two side plates 45 which are spaced from each other and which are connected by a rear plate 46, in which a torsion leaf spring 47 is mounted with the aid of which the cassette holder is pivotably mounted on supports 48 of the frame 25. Furthermore, the cassette holder comprises a bottom plate 49 and a connecting member 50, which interconnects the two side plates 45. The resilient loading means for urging the reel hubs 3 against the stops 41 during operation comprise reel hub loaders 43 which are journalled with play, in the connecting member 50 of the cassette holder 44. Each of the reel hub loaders is provided with a centering portion 51 for centering the reel hub loader relative to a tubular reel winding member of a reel hub 3. The reel hub loaders are each loaded by the pressure springs 42, which cooperate with the reel hub loaders 43 at a central location opposite the centering portions 51 substantially by a point contact, namely with a rounded projection 52, which in the operating position is disposed on the axis of rotation 26 of the drive spindle 27.

On the side which faces away from the cassette supporting means 34 and 35 the cassette holder 44 is provided with bearing members 53 which are connected to the connecting member 50, which bearing members take the form of bent metal strips which are connected to the connecting member 50. In the bearing members 53 apertures 54 are formed for the reel hub loaders 43, which apertures have such a diameter that the reel hub loaders are rotatable and are axially movable with play in the apertures. Each reel hub loader is provided with a stop collar 55 for limiting the axial movement in the direction of the bottom 49 of the cassette holder. A cassette which is placed in the cassette holder is urged against the bottom 49 with the aid of levers 56, which are journalled on the side plates 45, and tension springs 57. For this purpose the levers 56 comprise a pin 58, which pins 58 pass through slots 59 of the side plates 45 and on which the springs 57 act. On its other side each lever is mounted on a bearing pin 112 and is retained on that pin by means of a retaining ring 113. The distance between the reel hub loader 43 and the bottom 49, the dimensions of the magnetic tape cassette 1 and the reel hubs 3, the dimensions of the cassette holder 44 and the cassette supporting means 34 and 35 are all adapted to each other in such a way that in the open position of the cassette holder, see FIG. 7, the video cassette is movable over the bottom 49 of the cassette holder without contacting the reel hub loaders, and that in the closed position, see FIG. 8, the video cassette is supported by the cassette supporting means 34 and 35 at such a distance from the bottom 49 of the cassette holder 44, that the reel hub loaders 43 can cooperate with the reel hubs 3 so as to be freely movable in the apertures 54 of the bearing members 53. Thus no undesired frictional forces or torques which have an adverse effect on the uniformity of the tape transport and the tension in the magnetic tape are exerted on the spool 12 during operation.

Figure 5:
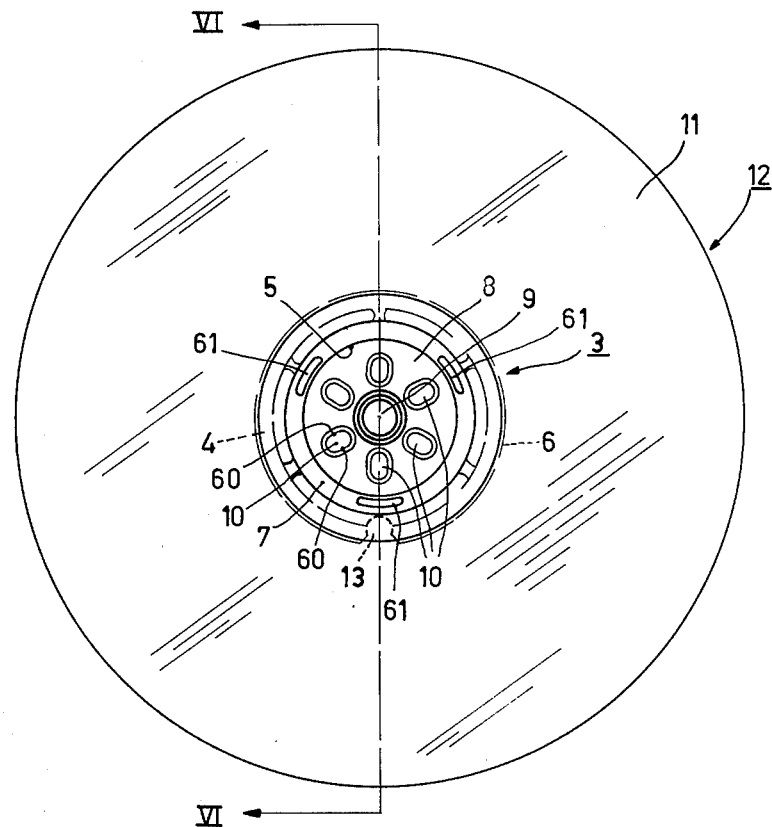
FIG. 5 is a plan view of a spool of the video cassette in accordance with the preceding figures.
Figure 6:
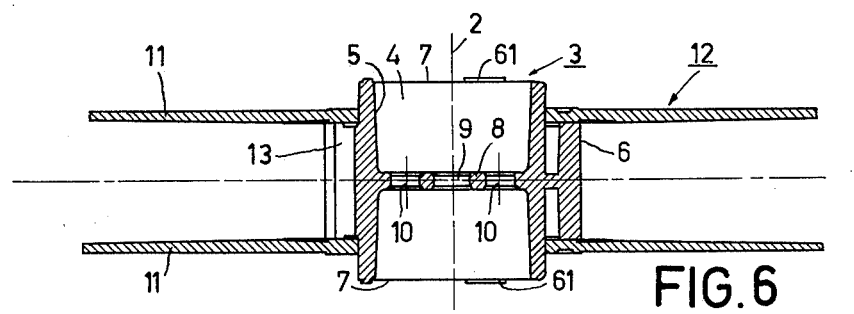
FIG. 6 is a cross-sectional view in accordance with the arrows VI—VI in FIG. 5.

FIG. 5 shows that the drive apertures 10 in the reel hubs 3 are not round but have more or less an oval shape. In order to prevent that during operation the drive pins 32 of the drive spindles 29 transmit non-tangentially directed forces to the reel hubs 3 the drive apertures 10 are locally bounded by flat wall portions 60, which extend substantially radially relative to the axis of rotation 2 of the reel hub. The more or less oval shape moreover serves to take up tolerances in the radial distance of a drive pin 33 relative to an axis of rotation 26 of a drive spindle, while requiring only minimal play between the drive pin and the flat walls.

Each of the annular end walls 7 of the reel hubs 3 comprise three axially directed projections 61 which are disposed at equal radial distances from the axis of rotation 2 of the reel hub and at equal distances from each other. The annular stops 41 which rotate along with the drive spindles 27 each have an annular stop surface 62 which is disposed in a plane perpendicular to the axis of rotation 26 of a drive spindle 27. Thus the reel hubs 3 and the stops 41 cooperate with each other by means of a three-point contact, in such a way that an unambiguously defined position of each spool on its stop is guaranteed.

Figure 9:
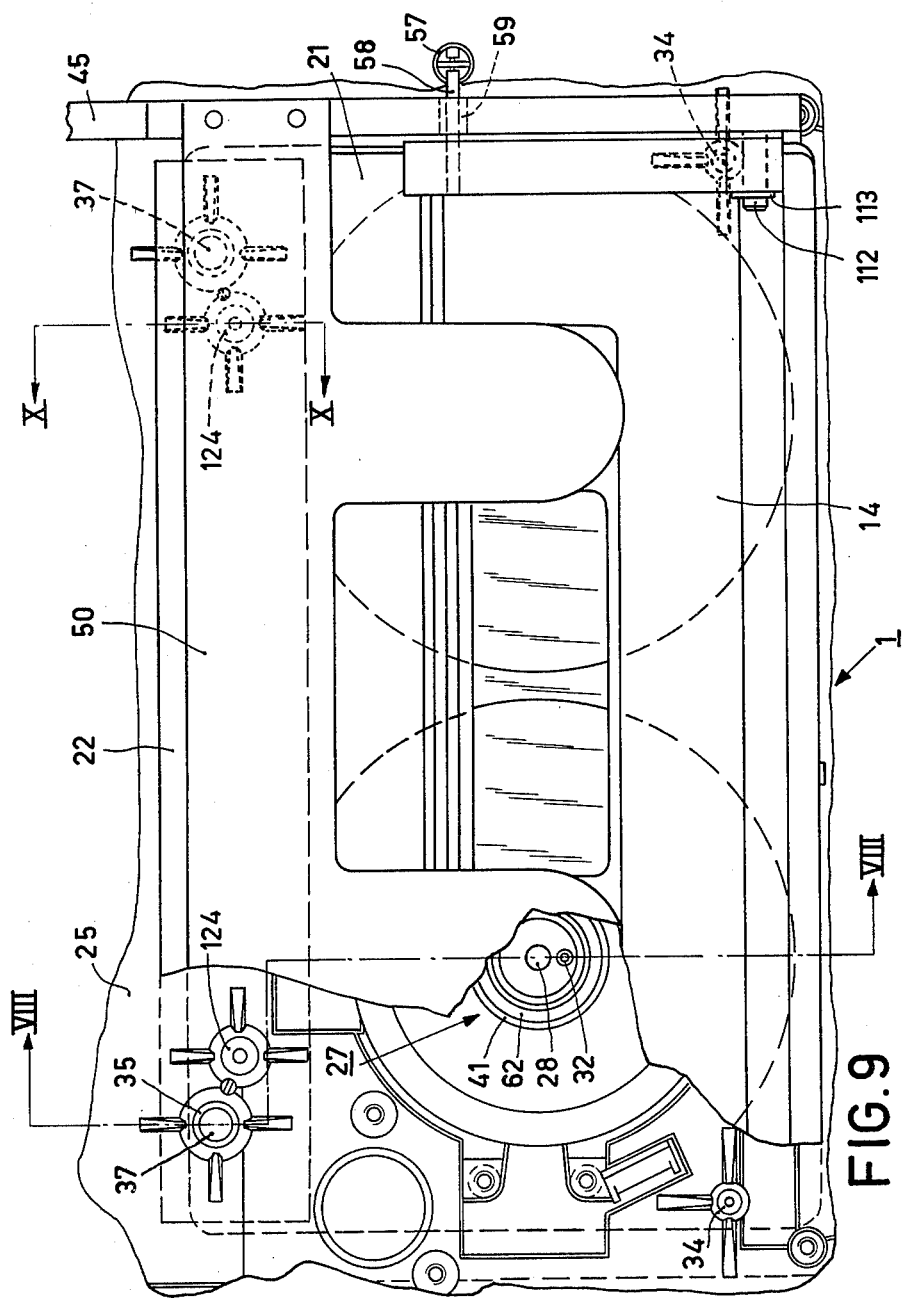
FIG. 9 is a plan view of the part of the video recorder of FIGS. 7 and 8, the video cassette being disposed on the drive arrangement and the cassette holder being closed parts of the video cassette and the cassette holder have been cut away to show the parts situated underneath them.

FIG. 9 shows the method of positioning the video cassette on the cassette supporting means 34 and 35. At the location of the cross-section X—X in FIG. 9 a locating pin 124, having a conical end 125, engages an aperture 122 of the cassette, the cylindrical portion of the locating pin having a slight play in the aperture. A second locating pin 124 engages an aperture 123 of the video cassette (see FIG. 4 and FIG. 9).

Figure 11:
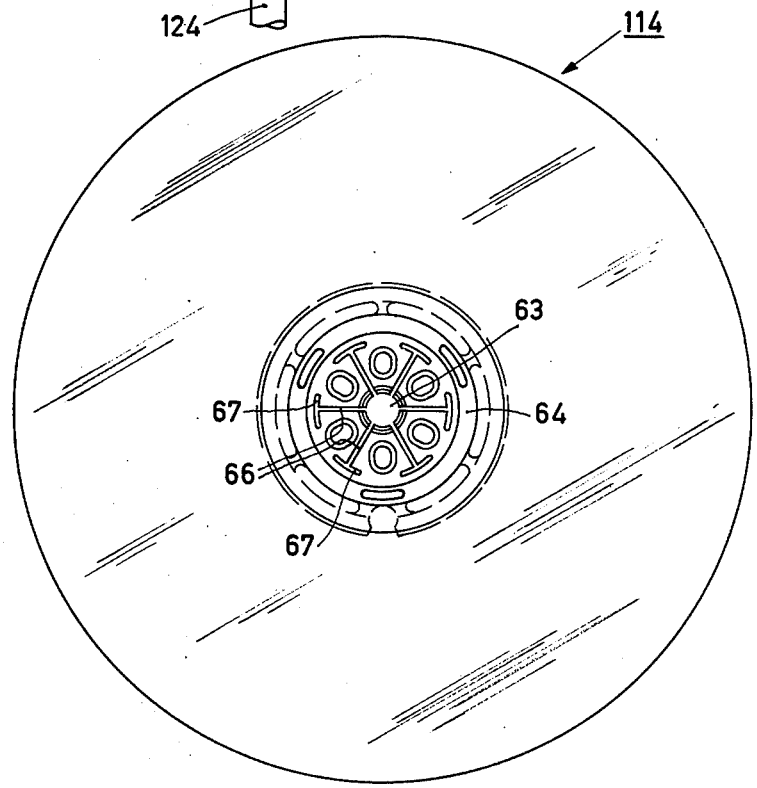
FIG. 11 is a plan view of a spool suitable for play-free centering on the drive spindle.

FIG. 11 relates to a slightly different spool 114, the transverse dimension of the centering aperture 63 of the reel hub 64 having a diameter which is smaller than the diameter of the centering pins 28 of the drive means and a disc-shaped centering and drive member 65 being provided with slots 66 which extend radially relative to the axis of rotation of the spool and which terminate at their inner ends in the centering aperture 63 and at their outer ends in respective transverse slots 67 on the side opposite the centering aperture 63. By means of these slots it is possible to clamp the disc-shaped centering and drive member 65 onto a centering pin 28 of a drive spindle, the portions which are separated from each other by the slots 66 and 67 being slightly bent. This enables excellent centering of the spool, because there is no play at all between the spool and the centering pins in the drive arrangement. Obviously, for arranging such a spool on a centering pin, a specific axial force is required, while removal of the spool also demands a certain axial force.

Figure 12:
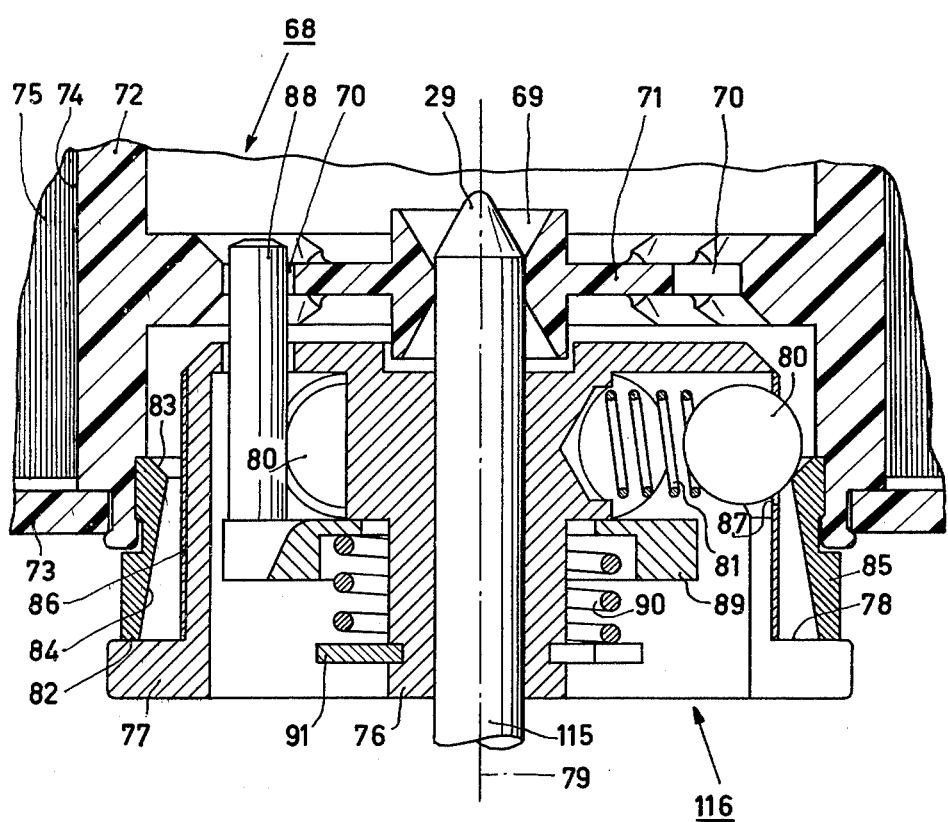
FIG. 12 is a cross-section of another embodiment of a reel hub and a drive spindle, the reel hub resiliently bearing against an axial positioning surface with the aid of resiliently loaded balls in the drive spindle.
Figure 13:
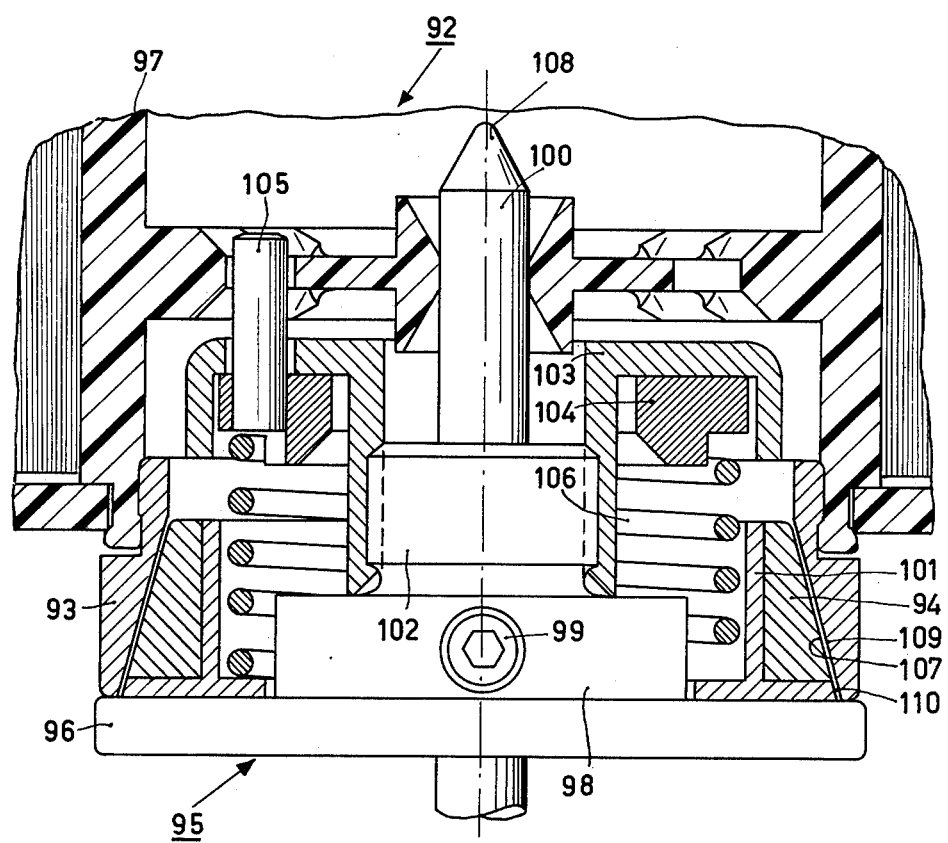
FIG. 13 is a view similar to FIG. 12, of yet another embodiment in which a reel hub is magnetically held against a positioning surface.

This is also the case with two other embodiments, namely those in accordance with FIGS. 12 and 13. FIG. 12 illustrates the cooperation between a centering pin 115 and a reel hub 68, which only differs from the previously described reel hubs 3 in respect of details. The reel hub 68 also has a centering aperture 69 as well as six drive apertures 70 in a disc-shaped centering and drive member 71. The tubular reel winding member 72 has reel flanges 73 on both sides, one of which is shown in the drawing, partly in cross-section. On the cylindrical outer wall 74 of the reel winding member 72 a reel 75 is wound. A member 76 is clamped onto the centering pin 115 and forms a part of a drive spindle 116. A flange-shaped portion 77 of the member 76 comprises an annular stop surface 82 on its upper side, which surface is disposed in a plane perpendicular to the axis of rotation 79 of the centring pin 115. In this embodiment the resilient loading means for resiliently urging the reel hubs 68 against the stop 77 during operation comprise a plurality of loading members in the form of balls 80, which are mounted on each drive spindle and which are movable to a limited extent between a first or outer position, and a second or inner position, nearer the axis of rotation 79. These members are loaded towards their outer position by pressure springs 81. The tubular reel winding member 72 of the reel hub 68 is provided with an internal annular stop 83 for the balls 80 near its end walls 82. As is shown in FIG. 11 the balls 80 bear on the annular stop 83 during operation. They exert on the annular stop 83 a force having a component which is directed towards the stop 77. The stop 83 has a conical shape, each ball 80 bearing on the conical surface at a point which is disposed below the ball center.

Near the end walls 82 of the reel hub 68 the tubular reel winding member 72 has a conical inner wall 84, whose diameter decreases down to the annular stop 83. This inner wall serves to move the balls 80 gradually from their outer to their inner position until the annular stop 83 is reached during positioning of the magnetic tape cassette on the drive arrangement. The inner wall 84 belongs to a metal ring 85 which forms part of the tubular reel winding member 72 of the reel hub 68. On the member 76 which belongs to the drive spindle 116 a cylindrical metal sleeve 86 is fitted which retains the balls 80. At the location of the balls 80 round apertures 87 are formed in the sleeve which have a diameter which is slightly smaller than the largest diameter of the balls 80, so that the balls can project from the sleeve but cannot be pressed out of the aperture by the springs 81. A drive pin 88 is secured to a ring 89 inside the member 76. A pressure spring 90 urges the ring 89 upwards and bears on a stop ring 91 with its other end. As a result of this construction the drive pin 88 is resiliently depressable to a limited extent in an axial direction.

In FIG. 13 the reel hub 92 is substantially identical to that of FIG. 11, except that instead of the metal ring 85 a differently shaped metal ring 92 is employed. This ring functions as an armature ring and is made of a magnetizable material which cooperates with magnetic means in the form of a permanent magnet 94, which forms part of a drive spindle 95 and by means of which the metal armature ring 93 is drawn against a stop 96 which functions as reel hub positioning means. This stop forms part of an element 98 which is secured to a motor spindle 100, which functions as centering pin, with the aid of a screw 99. The permanent magnet 94 is glued onto a plastic support 101, which by means of screws, not shown, is connected to the stop 96. The member 98 is provided with a threaded portion 102 onto which a cap 103 is fitted. Underneath this cap a ring 104 is located to which the drive spindle 105 is secured. A pressure spring 106 urges the ring 104 upwards and is supported by plastic support 101.

The permanent magnet 94 on the drive spindle 95 is annular and has an outer wall 107 in the form of a truncated cone, of which the part with the smallest diameter is situated nearer the free end 108 of the centering pin 100. The armature ring 93 has an inner wall 109 with a conical shape which corresponds to that of the outer wall 107 of the permanent magnet 94 on the drive spindle 95. In the operating position, see FIG. 12, an air gap 110 of substantially uniform thickness is formed between the outer wall 107 of the permanent magnet 94 and the inner wall 109 of the armature ring 93. On its surface 107 the permanent magnet is provided with a large number of alternate north poles and south poles, so that in the operating condition the magnetic field lines are correctly shielded by the armature ring 93, which ensures that no problems can arise as a result of undesired stray fields. Moreover, the cap 103 and the stop 96 also consist of a magnetizable metal.

What is claimed is:

1. A magnetic tape cassette apparatus adapted for use with a flip-over magnetic tape cassette having two reel hubs spaced from each other and rotatable about parallel axes of rotation, comprising
   a frame,
   cassette supporting means connected to the frame for engaging an external surface of a magnetic tape cassette for operative cooperation of the apparatus with magnetic tape in the cassette, said means comprising a cassette holder mounted to the frame for movement between an open position, for inserting or removing said magnetic tape cassette, and a closed position for retaining the cassette in an operating position, and
   a drive arrangement comprising first and second drive spindles rotatable about parallel axes; each drive spindle including centering means for engaging a respective reel hub in the cassette for positioning the hub coaxially about the respective spindle rotation axis, and a drive pin disposed at a given radial distance from the respective axis, said pin being adapted to engage a drive aperture in said respective reel hub,
   wherein each spindle has a hub axial positioning surface which rotates with the spindle, arranged for engaging an end wall of the reel hub, and
   the cassette supporting means includes resilient loading means for urging the respective reel hubs against said axial positioning surfaces when the cassette is in the operating position,
   said loading means comprising first and second hub loaders rotatably journalled with axial and radial play in the cassette holder, disposed opposite the respective spindles when the holder is in the closed position, each hub loader having a centering portion arranged for engaging a centering surface on the respective hub; and spring means for engaging the loaders for urging the loaders toward the spindles thereby bringing the loader centering portion into engagement with the centering surface on the hub, each pressure spring cooperating with the respective loader through a point contact at a central location opposite the centering portion.

2. An apparatus as claimed in claim 1, wherein the cassette holder has a partly open bottom through which the drive spindles pass when the holder is in the closed position, and a bearing member with apertures for the first and second hub loaders, each loader including a stop collar for limiting axial movement of the loader in the direction of said bottom, the dimensions of the cassette support means being arranged with respect to the dimensions of a cassette to be used with the apparatus such that in the holder open position the cassette is movable over the bottom of the holder without touching the reel hub loaders, and in the holder closed position the cassette is supported at such a distance from the holder bottom that the reel hub loaders engage the reel hubs, the loaders being freely movable in the apertures of the bearing member.

3. A magnetic tape drive system comprising a cassette apparatus and a flip-over cassette, said cassette having two reel hubs spaced from each other and rotatable about parallel axes of rotation, comprising
   a frame,
   cassette supporting means connected to the frame for engaging an external surface of a magnetic tape cassette for operative cooperation of the apparatus with magnetic tape in the cassette, said means comprising a cassette holder mounted to the frame for movement between an open position, for inserting or removing said magnetic tape cassette, and a closed position for retaining the cassette in an operating position, and
   a drive arrangement comprising first and second drive spindles rotatable about parallel axes; each drive spindle including centering means for engaging a respective reel hub in the cassette for positioning the hub coaxially about the respective spindle rotation axis, and a drive pin disposed at a given radial distance from the respective axis, said pin being adapted to engage a drive aperture in said respective reel hub,
   wherein each spindle has a hub axial positioning surface which rotates with the spindle, arranged for engaging an end wall of the reel hub, and
   each spindle including resilient loading means for urging the respective reel hubs against said axial positioning surfaces when the cassette is in the operating position, said loading means arranged to apply axial force to the reel hub which increases uniformly as the reel hub is moved axially onto the spindle.

4. A system as claimed in claim 3, wherein said centering means comprises a centering pin in each spindle having a free end arranged to engage in a centering aperture in the respective reel hub, and each drive spindle includes an annular magnet having an outer wall shaped as a truncated cone whose smaller end is directed toward the free end of the centering pin, and
   each reel hub has an armature ring of magnetizable material, having a conical inner wall coaxial with the hub axis of rotation and spaced from the outer wall of the respective magnet, in the operating position of the holder the magnet and armature ring defining an air gap of substantially uniform thickness for urging the reel hubs against said axial positioning surfaces.

5. A system as claimed in claim 3, wherein said resilient loading means comprises a plurality of pressure members mounted on each drive spindle for movement to a limited extent between a first outer position and a second position nearer the axis of rotation of the drive spindle, and resilient means for loading the pressure members toward the first position, each reel winding hub having an inner wall having an internal annular stop arranged for engagement by the pressure members such that the pressure members exert a force on the reel hub having at least a component directed toward the reel hub positioning means, and the inner wall of each reel hub has a diameter which decreases gradually from a location near each of the two end walls toward the annular stop, for gradually moving the pressure members from their first position in the direction of their second position until the annular stop is reached when the cassette is fully placed on the drive arrangement.

6. A flip-over magnetic tape cassette for use with a magnetic tape cassette apparatus, the cassette having two main walls and two reel hubs disposed between said walls, spaced from each other and rotatable about parallel axes of rotation, each hub including a single disc-shaped centering and drive member arranged for engagement by a drive spindle of a magnetic tape apparatus when the cassette is supported on the apparatus in an operating position, said member being engageable from either axial direction as the cassette is operated in a first position or in a flipped-over second position, each of said hubs having respective first and second end walls arranged for engagement by an axial positioning surface of a drive spindle of the apparatus in the first or second cassette positions, the centering and drive member having at least one drive aperture for engagement by a drive pin on the apparatus drive spindle, the drive aperture having two flat wall portions extending substantially axially and radially from the hub axis of rotation, so arranged that driving contact by the pin is against one of the flat wall portions, whereby the drive pin transmits tangentially directed force only to the reel hub.

7. A cassette as claimed in claim 6, wherein each of said drive apertures is elongated in the radial direction, and has a substantially oval shape.

8. A flip-over magnetic tape cassette for use with a magnetic tape cassette apparatus, the cassette having two main walls and two reel hubs disposed between said walls, spaced from each other and rotatable about parallel axes of rotation, each hub including a single disc-shaped centering and drive member arranged for engagement by a drive spindle of a magnetic tape apparatus when the cassette is supported on the apparatus in an operating position, said member being engageable from either axial direction as the cassette is operated in a first position or in a flipped-over second position, each of said hubs having two opposed end walls, each end wall having three axially extending projections disposed equidistant from each other at equal radial distances from the hub axis of rotation, adapted to be engaged by a planar annular axial positioning surface on the drive spindle perpendicular to the axis of rotation, whereby in either the first or second cassette position the hub cooperates with the spindle axial positioning surface by a three point contact.

9. A cassette as claimed in claim 6 or claim 8, wherein said centering and drive member has a centering aperture adapted for engagement by a centering pin on the respective drive spindle, the centering aperture having a transverse dimension less than the transverse dimension of the centering pin; and said member has a plurality of equally spaced slots extending radially from the centering aperture and separating portions of the member, whereby upon sliding the centering and drive member onto the centering pin said portions will be slightly bent and will clamp the member on the pin.

* * * * *